(12) United States Patent  
Hill

(10) Patent No.: US 11,774,249 B2
(45) Date of Patent: Oct. 3, 2023

(54) SYSTEM AND METHOD OF PERSONALIZED NAVIGATION INSIDE A BUSINESS ENTERPRISE

(71) Applicant: Position Imaging, Inc., Portsmouth, NH (US)

(72) Inventor: Edward L. Hill, Conway, NH (US)

(73) Assignee: POSITION IMAGING, INC., Portsmouth, NH (US)

(*) Notice: Subject to any disclaimer, the term of this patent is extended or adjusted under 35 U.S.C. 154(b) by 0 days.

(21) Appl. No.: 17/964,268

(22) Filed: Oct. 12, 2022

(65) Prior Publication Data

US 2023/0035636 A1   Feb. 2, 2023

Related U.S. Application Data

(63) Continuation of application No. 17/307,254, filed on May 4, 2021, now Pat. No. 11,506,501, which is a (Continued)

(51) Int. Cl.
*H04W 4/33* (2018.01)
*G01C 21/20* (2006.01)
(Continued)

(52) U.S. Cl.
CPC .......... *G01C 21/206* (2013.01); *G06T 7/579* (2017.01); *G06V 20/53* (2022.01); *G06V 40/103* (2022.01);
(Continued)

(58) Field of Classification Search
CPC ...... G01C 21/206; G06T 7/579; G06V 20/53; G06V 40/103; G06V 20/52; H04B 17/318;
(Continued)

(56) References Cited

U.S. PATENT DOCUMENTS 2,408,122 A   9/1946   Wirkler
3,824,596 A   7/1974   Guion et al.
(Continued)

FOREIGN PATENT DOCUMENTS

WO   2001006401 A1   1/2001
WO   2005010550 A1   2/2005
WO   2009007198 A1   1/2009

OTHER PUBLICATIONS

Notice of Allowance in U.S. Appl. No. 17/307,254 dated Jun. 29, 2022.
(Continued)

*Primary Examiner* — Julio R Perez
(74) *Attorney, Agent, or Firm* — Schmeiser, Olsen & Watts LLP

(57) ABSTRACT

Systems and methods for tracking movement of individuals through a building receive, by one or more RF nodes disposed near an entrance to the building, RF signals from RF-transmitting mobile devices carried by persons near the entrance, capture an image of the persons while they are near the entrance, determine an identity and relative distance of each RF-transmitting mobile device from each RF node based on information associated with the RF signals received by that RF node, detect humans in the image, determine a relative depth of each human in the image, and assign the identity of each RF-transmitting mobile device to one of the humans detected in the image based on the relative distance of each RF-transmitting mobile device from each RF node and the relative depth of each human in the image, thereby identifying each individual who to be tracked optically as that individual moves throughout the building.

20 Claims, 7 Drawing Sheets

Related U.S. Application Data continuation of application No. 16/857,399, filed on Apr. 24, 2020, now Pat. No. 11,022,443, which is a continuation of application No. 16/658,951, filed on Oct. 21, 2019, now Pat. No. 10,634,506, which is a continuation-in-part of application No. 16/163,708, filed on Oct. 18, 2018, now Pat. No. 10,455,364, which is a continuation-in-part of application No. 15/839,298, filed on Dec. 12, 2017, now Pat. No. 10,634,503.

(60) Provisional application No. 62/432,876, filed on Dec. 12, 2016.

(51) Int. Cl.
*H04W 4/021* (2018.01)
*G06T 7/579* (2017.01)
*H04B 17/318* (2015.01)
*G06V 20/52* (2022.01)
*G06V 40/10* (2022.01)

(52) U.S. Cl.
CPC .......... *H04B 17/318* (2015.01); *H04W 4/021* (2013.01); *H04W 4/33* (2018.02)

(58) Field of Classification Search
CPC ........ H04B 17/27; H04W 4/021; H04W 4/33; H04W 4/029; G06Q 10/087; G06Q 30/0259; G06Q 30/0269
See application file for complete search history.

(56) References Cited

U.S. PATENT DOCUMENTS

| | | | |
|---|---|---|---|
| 3,940,700 A | 2/1976 | Fischer | |
| 4,018,029 A | 4/1977 | Safranski et al. | |
| 4,328,499 A | 5/1982 | Anderson et al. | |
| 4,570,416 A | 2/1986 | Shoenfeld | |
| 5,010,343 A | 4/1991 | Andersson | |
| 5,343,212 A | 8/1994 | Rose et al. | |
| 5,426,438 A | 6/1995 | Peavey et al. | |
| 5,510,800 A | 4/1996 | McEwan | |
| 5,574,468 A | 11/1996 | Rose | |
| 5,592,180 A | 1/1997 | Yokev et al. | |
| 5,600,330 A | 2/1997 | Blood | |
| 5,657,026 A | 8/1997 | Culpepper et al. | |
| 5,923,286 A | 7/1999 | Divakaruni | |
| 5,953,683 A | 9/1999 | Hansen et al. | |
| 6,088,653 A | 7/2000 | Sheikh et al. | |
| 6,101,178 A | 8/2000 | Beal | |
| 6,167,347 A | 12/2000 | Lin | |
| 6,255,991 B1 | 7/2001 | Hedin | |
| 6,292,750 B1 | 9/2001 | Lin | |
| 6,409,687 B1 | 6/2002 | Foxlin | |
| 6,417,802 B1 | 7/2002 | Diesel | |
| 6,492,905 B2 | 12/2002 | Mathias et al. | |
| 6,496,778 B1 | 12/2002 | Lin | |
| 6,512,748 B1 | 1/2003 | Mizuki et al. | |
| 6,593,885 B2 | 7/2003 | Wisherd et al. | |
| 6,630,904 B2 | 10/2003 | Gustafson et al. | |
| 6,634,804 B1 | 10/2003 | Toste et al. | |
| 6,683,568 B1 | 1/2004 | James et al. | |
| 6,697,736 B2 | 2/2004 | Lin | |
| 6,720,920 B2 | 4/2004 | Breed et al. | |
| 6,721,657 B2 | 4/2004 | Ford et al. | |
| 6,744,436 B1 | 6/2004 | Chirieleison et al. | |
| 6,750,816 B1 | 6/2004 | Kunysz | |
| 6,861,982 B2 | 3/2005 | Forstrom et al. | |
| 6,867,774 B1 | 3/2005 | Halmshaw et al. | |
| 6,988,079 B1 | 1/2006 | Or-Bach et al. | |
| 6,989,789 B2 | 1/2006 | Ferreol et al. | |
| 7,009,561 B2 | 3/2006 | Menache et al. | |
| 7,143,004 B2 | 11/2006 | Townsend et al. | |
| 7,168,618 B2 | 1/2007 | Schwartz | |
| 7,190,309 B2 | 3/2007 | Hill | |
| 7,193,559 B2 | 3/2007 | Ford et al. | |
| 7,236,091 B2 | 6/2007 | Kiang et al. | |
| 7,292,189 B2 | 11/2007 | Or et al. | |
| 7,295,925 B2 | 11/2007 | Breed et al. | |
| 7,315,281 B2 | 1/2008 | Dejanovic et al. | |
| 7,336,078 B1 | 2/2008 | Merewether et al. | |
| 7,409,290 B2 | 8/2008 | Lin | |
| 7,443,342 B2 | 10/2008 | Shirai et al. | |
| 7,499,711 B2 | 3/2009 | Hoctor et al. | |
| 7,533,569 B2 | 5/2009 | Sheynblat | |
| 7,612,715 B2 | 11/2009 | Macleod | |
| 7,646,330 B2 | 1/2010 | Karr | |
| 7,689,465 B1 | 3/2010 | Shakes et al. | |
| 7,844,507 B2 | 11/2010 | Levy | |
| 7,868,760 B2 | 1/2011 | Smith et al. | |
| 7,876,268 B2 | 1/2011 | Jacobs | |
| 7,933,730 B2 | 4/2011 | Li et al. | |
| 3,009,918 A1 | 8/2011 | Van Droogenbroeck et al. | |
| 8,189,855 B2 | 5/2012 | Opalach et al. | |
| 8,201,737 B1 | 6/2012 | Palacios Durazo et al. | |
| 8,219,438 B1 | 7/2012 | Moon et al. | |
| 8,269,654 B2 | 9/2012 | Jones | |
| 8,295,542 B2 | 10/2012 | Albertson et al. | |
| 8,406,470 B2 | 3/2013 | Jones et al. | |
| 8,457,655 B2 | 6/2013 | Zhang et al. | |
| 8,619,144 B1 | 12/2013 | Chang et al. | |
| 8,749,433 B2 | 6/2014 | Hill | |
| 8,836,580 B2* | 9/2014 | Mendelson | G06Q 30/0239 342/450 |
| 8,860,611 B1 | 10/2014 | Anderson et al. | |
| 8,957,812 B1 | 2/2015 | Hill et al. | |
| 9,063,215 B2 | 6/2015 | Perthold et al. | |
| 9,092,898 B1 | 7/2015 | Fraccaroli et al. | |
| 9,120,621 B1 | 9/2015 | Curlander et al. | |
| 9,141,194 B1 | 9/2015 | Keyes et al. | |
| 9,171,278 B1 | 10/2015 | Kong et al. | |
| 9,174,746 B1 | 11/2015 | Bell et al. | |
| 9,204,251 B1* | 12/2015 | Mendelson | G01C 21/206 |
| 9,269,022 B2 | 2/2016 | Rhoads et al. | |
| 9,270,952 B2* | 2/2016 | Jamtgaard | G01S 17/00 |
| 9,349,076 B1 | 5/2016 | Liu et al. | |
| 9,424,493 B2 | 8/2016 | He et al. | |
| 9,482,741 B1 | 11/2016 | Min et al. | |
| 9,497,728 B2 | 11/2016 | Hill | |
| 9,514,389 B1 | 12/2016 | Erhan et al. | |
| 9,519,344 B1 | 12/2016 | Hill | |
| 9,544,552 B2 | 1/2017 | Takahashi | |
| 9,594,983 B2 | 3/2017 | Alattar et al. | |
| 9,656,749 B1 | 5/2017 | Hanlon | |
| 9,740,937 B2 | 8/2017 | Zhang et al. | |
| 9,782,669 B1 | 10/2017 | Hill | |
| 9,872,151 B1 | 1/2018 | Puzanov et al. | |
| 9,883,348 B1* | 1/2018 | Walker | G01C 21/165 |
| 9,904,867 B2 | 2/2018 | Fathi et al. | |
| 9,933,509 B2 | 4/2018 | Hill et al. | |
| 9,961,503 B2 | 5/2018 | Hill | |
| 9,996,818 B1 | 6/2018 | Ren et al. | |
| 10,001,833 B2 | 6/2018 | Hill | |
| 10,148,918 B1 | 12/2018 | Seiger et al. | |
| 10,163,149 B1 | 12/2018 | Famularo et al. | |
| 10,180,490 B1 | 1/2019 | Schneider et al. | |
| 10,257,654 B2 | 4/2019 | Hill | |
| 10,282,852 B1* | 5/2019 | Buibas | G06T 7/246 |
| 10,416,276 B2 | 9/2019 | Hill et al. | |
| 10,444,323 B2 | 10/2019 | Min et al. | |
| 10,455,364 B2* | 10/2019 | Hill | G01S 5/14 |
| 10,634,503 B2* | 4/2020 | Hill | G06Q 10/04 |
| 10,634,506 B2* | 4/2020 | Hill | G06Q 10/087 |
| 10,755,106 B1* | 8/2020 | Bakry | G06V 40/103 |
| 11,022,443 B2* | 6/2021 | Hill | G06V 20/52 |
| 2001/0027995 A1 | 10/2001 | Patel et al. | |
| 2002/0021277 A1 | 2/2002 | Kramer et al. | |
| 2002/0095353 A1 | 7/2002 | Razumov | |
| 2002/0140745 A1 | 10/2002 | Ellenby et al. | |
| 2002/0177476 A1 | 11/2002 | Chou | |
| 2003/0053492 A1 | 3/2003 | Matsunaga | |
| 2003/0120425 A1 | 6/2003 | Stanley et al. | |
| 2003/0176196 A1 | 9/2003 | Hall et al. | |

(56) References Cited

U.S. PATENT DOCUMENTS

| | | |
|---|---|---|
| 2003/0184649 A1 | 10/2003 | Mann |
| 2003/0195017 A1 | 10/2003 | Chen et al. |
| 2004/0002642 A1 | 1/2004 | Dekel et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0062849 A1 | 3/2005 | Foth et al. |
| 2005/0143916 A1 | 6/2005 | Kim et al. |
| 2005/0154685 A1 | 7/2005 | Mundy et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0114575 A1 | 5/2009 | Carpenter et al. |
| 2009/0121017 A1 | 5/2009 | Cato et al. |
| 2009/0149202 A1 | 6/2009 | Hill et al. |
| 2009/0224040 A1 | 9/2009 | Kushida et al. |
| 2009/0243932 A1 | 10/2009 | Moslifeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0002509 A1 | 1/2011 | Nobori et al. |
| 2011/0006774 A1 | 1/2011 | Baiden |
| 2011/0037573 A1 | 2/2011 | Choi |
| 2011/0066086 A1 | 3/2011 | Aarestad et al. |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2011/0286633 A1 | 11/2011 | Wang et al. |
| 2011/0313893 A1 | 12/2011 | Weik, III |
| 2012/0013509 A1 | 1/2012 | Wisherd et al. |
| 2012/0020518 A1 | 1/2012 | Taguchi |
| 2012/0087572 A1 | 4/2012 | Dedeoglu et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0257061 A1 | 10/2012 | Edwards et al. |
| 2012/0258729 A1* | 10/2012 | Siomina .................. G01S 5/08 455/456.1 |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moslifeghi |
| 2013/0036043 A1 | 2/2013 | Faith |
| 2013/0051624 A1 | 2/2013 | Iwasaki et al. |
| 2013/0063567 A1 | 3/2013 | Burns et al. |
| 2013/0073093 A1 | 3/2013 | Songkakul |
| 2013/0113993 A1 | 5/2013 | Dagit, III |
| 2013/0143595 A1* | 6/2013 | Moshfeghi ........ G01S 5/02521 455/456.1 |
| 2013/0182114 A1 | 7/2013 | Zhang et al. |
| 2013/0191193 A1 | 7/2013 | Calman et al. |
| 2013/0226655 A1 | 8/2013 | Shaw |
| 2013/0281084 A1 | 10/2013 | Batada et al. |
| 2013/0293722 A1 | 11/2013 | Chen |
| 2013/0314210 A1 | 11/2013 | Schoner et al. |
| 2013/0335318 A1 | 12/2013 | Nagel et al. |
| 2013/0335415 A1 | 12/2013 | Chang |
| 2014/0022058 A1 | 1/2014 | Striemer et al. |
| 2014/0108136 A1 | 4/2014 | Zhao et al. |
| 2014/0139426 A1 | 5/2014 | Kryze et al. |
| 2014/0253368 A1 | 9/2014 | Holder |
| 2014/0270356 A1 | 9/2014 | Dearing et al. |
| 2014/0300516 A1 | 10/2014 | Min et al. |
| 2014/0317005 A1 | 10/2014 | Balwani |
| 2014/0330603 A1 | 11/2014 | Corder et al. |
| 2014/0357295 A1 | 12/2014 | Skomra et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0055821 A1 | 2/2015 | Fotland |
| 2015/0059374 A1 | 3/2015 | Hebel |
| 2015/0085096 A1 | 3/2015 | Smits |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0170002 A1 | 6/2015 | Szegedy et al. |
| 2015/0199025 A1* | 7/2015 | Holz .................... G06F 3/0425 345/156 |
| 2015/0210199 A1 | 7/2015 | Payne |
| 2015/0221135 A1 | 8/2015 | Hill et al. |
| 2015/0248765 A1 | 9/2015 | Criminisi et al. |
| 2015/0254906 A1 | 9/2015 | Berger et al. |
| 2015/0278759 A1 | 10/2015 | Harris et al. |
| 2015/0323643 A1 | 11/2015 | Hill et al. |
| 2015/0341551 A1 | 11/2015 | Perrin et al. |
| 2015/0362581 A1 | 12/2015 | Friedman et al. |
| 2015/0371178 A1 | 12/2015 | Abhyanker et al. |
| 2015/0371319 A1 | 12/2015 | Argue et al. |
| 2015/0379366 A1 | 12/2015 | Nomura et al. |
| 2016/0035078 A1 | 2/2016 | Lin et al. |
| 2016/0063610 A1 | 3/2016 | Argue et al. |
| 2016/0093184 A1 | 3/2016 | Locke et al. |
| 2016/0098679 A1 | 4/2016 | Levy |
| 2016/0140436 A1 | 5/2016 | Yin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0195602 A1 | 7/2016 | Meadow |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0123426 A1 | 5/2017 | Hill et al. |
| 2017/0140329 A1 | 5/2017 | Bernhardt et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0293885 A1 | 10/2017 | Grady et al. |
| 2017/0323174 A1 | 11/2017 | Joshi et al. |
| 2017/0323376 A1 | 11/2017 | Glaser et al. |

(56) References Cited

U.S. PATENT DOCUMENTS

| | | |
|---|---|---|
| 2017/0350961 A1 | 12/2017 | Hill et al. |
| 2017/0351255 A1 | 12/2017 | Anderson et al. |
| 2017/0372524 A1 | 12/2017 | Hill |
| 2017/0374261 A1 | 12/2017 | Teich et al. |
| 2018/0033151 A1 | 2/2018 | Matsumoto et al. |
| 2018/0068266 A1 | 3/2018 | Kirmani et al. |
| 2018/0094936 A1 | 4/2018 | Jones et al. |
| 2018/0164103 A1 | 6/2018 | Hill |
| 2018/0197139 A1 | 7/2018 | Hill |
| 2018/0197218 A1 | 7/2018 | Mallesan et al. |
| 2018/0231649 A1 | 8/2018 | Min et al. |
| 2018/0242111 A1 | 8/2018 | Hill |
| 2019/0053012 A1 | 2/2019 | Hill |
| 2019/0090744 A1 | 3/2019 | Mahfouz |
| 2019/0098263 A1 | 3/2019 | Seiger et al. |
| 2019/0172286 A1* | 6/2019 | Martin ............. G07C 9/30 |
| 2019/0295290 A1 | 9/2019 | Schena et al. |
| 2020/0011961 A1 | 1/2020 | Hill et al. |
| 2020/0097724 A1 | 3/2020 | Chakravarty et al. |
| 2021/0064857 A1* | 3/2021 | Semitsu ............. G06T 7/60 |

OTHER PUBLICATIONS

Brown, Matthew and David G. Lowe "Automatic Panoramic Image Stitching using Invariant Features," International Journal of Computer Vision, vol. 74, No. 1, pp. 59-73, 2007.

Alban, Santago "Design and Performance of a Robust GPS/INS Attitude System for Automobile Applications", Dissertation, Stanford University, Jun. 2004; 218 pages.

Farrell and Barth, "The Global Positioning System & Interial Navigation", 1999, McGraw-Hill; pp. 245-252.

Farrell, et al. "Real-Time Differential Carrier Phase GPS-Aided INS", Jul. 2000, IEEE Transactions on Control Systems Technology, vol. 8, No. 4; 13 pages.

Filho, et al. "Integrated GPS/INS Navigation System Based on a Gyroscope-Free IMU", DINCON Brazilian Conference on Synamics, Control, and Their Applications, May 22-26, 2006; 6 pages.

Gao, Jianchen "Development of a Precise GPS/INS/On-Board Vehicle Sensors Integrated Vehicular Positioning System", Jun. 2007, UCGE Reports No. 20555; 245 pages.

Gautier, Jennifer Denise "GPS/INS Generalized Evaluation Tool (Giget) for the Design and Testing of Integrated Navigation Systems", Dissertation, Stanford University, Jun. 2003; 160 pages.

Goodall, Christopher L., "Improving Usability of Low-Cost INS/GPS Navigation Systems using Intelligent Techniques", Jan. 2009, UCGE Reports No. 20276; 234 pages.

Grewal and Andrews "Global Positioning Systems, Inertial Navigation, and Integration" Section 8.6-8.6.3.1, 2001, John Weiley and Sons, pp. 252-256.

Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Proakis, John G. and Masoud Salehi, "Communication Systems Engineering", Second Edition, Prentice-Hall, Inc., Upper Saddle River, New Jersey, 2002; 815 pages.

Schmidt and Phillips, "INS/GPS Integration Architectures", NATO RTO Lecture Seriers, First Presented Oct. 20-21, 2003; 24 pages.

Schumacher, Adrian "Integration of a GPS aided Strapdown Inertial Navigation System for Land Vehicles", Master of Science Thesis, KTH Electrical Engineering, 2006; 67 pages.

Sun, Debo "Ultra-Tight GPS/Reduced IMU for Land Vehicle Navigation", Mar. 2010, UCGE Reports No. 20305; 254 pages.

Sun, et al., "Analysis of the Kalman Filter With Different Ins Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Vikas Numar N. "Integration of Inertial Navigation System and Global Positioning System Using Kalman Filtering", M.Tech Dissertation, Indian Institute of Technology, Bombay, Mumbai, Jul. 2004; 69 pages.

Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.

Yang, Yong "Tightly Coupled MEMS INS/GPS Integration with INS Aided Receiver Tracking Loops", Jun. 2008, UCGE Reports No. 20270; 205 pages.

"ADXL202/ADXL210 Product Sheet", Analog Devices, Inc., Analog. com, 1999.

Hill, et al. "Package Tracking Systems and Methods" U.S. Appl. No. 15/091,180, filed Apr. 5, 2016.

Hill, et al. "Video for Real-Time Confirmation in Package Tracking Systems" U.S. Appl. No. 15/416,366, filed Jan. 26, 2017.

Piotrowski, et al. "Light-Based Guidance for Package Tracking Systems" U.S. Appl. No. 15/416,379, filed Jan. 26, 2017.

Xu, Wei and Jane Mulligan "Performance Evaluation of Color Correction Approaches for Automatic Multi-view Image and Video Stitching," International Converence on Computer Vision and Pattern Recognition (CVPR10), San Francisco, CA, 2010.

Szeliski, Richard "Image Alignment and Stitching: A Tutorial,:" Technical Report, MST-TR-2004-92, Dec. 10, 2006.

Wilde, Andreas, "Extended Tracking Range Delay-Locked Loop," Proceedings IEEE International Conference on Communications, Jun. 1995, pp. 1051-1054.

Li, et al. "Multifrequency-Based Range Estimation of RFID Tags," IEEE International Conference on RFID, 2009.

Non-Final Office Action in U.S. Appl. No. 15/839,298 dated Jun. 1, 2018; 24 pages.

Non-Final Office Action in U.S. Appl. No. 15/839,298 dated Sep. 18, 2019; 34 pages.

Non-Final Office Action in U.S. Appl. No. 16/163,708 dated Mar. 29, 2019; 15 pages.

Notice of Allowance in U.S. Appl. No. 16/163,708 dated Jul. 26, 2019; 5 pages.

Notice of Allowance in U.S. Appl. No. 16/658,951 dated Feb. 7, 2020; 7 pages.

Notice of Allowance in U.S. Appl. No. 15/839,298 dated Mar. 10, 2020; 9 pages.

Final Office Ation in U.S. Appl. No. 15/839,298 dated Jan. 17, 2019; 26 pages.

International Search Report and Written Opinion in International Application No. PCT/US2020/056405, dated Nov. 20, 2020; 7 pages.

Notice of Allowance in U.S. Appl. No. 16/857,399 dated Feb. 18, 2021.

Non-Final Office Action in U.S. Appl. No. 16/857,399 dated Nov. 4, 2020.

International Preliminary Report on Patentability in PCT/US2020/056405 dated May 5, 2022.

* cited by examiner

SYSTEM AND METHOD OF PERSONALIZED NAVIGATION INSIDE A BUSINESS ENTERPRISE

CROSS-REFERENCE TO RELATED APPLICATIONS

This application is a continuation application of U.S. patent application Ser. No. 17/307,254, filed May 4, 2021, titled "System and Method of Personalized Navigation Inside a Business Enterprise," which is a continuation application of U.S. patent application Ser. No. 16/857,399, filed Apr. 24, 2020, issued as U.S. Pat. No. 11,022,443, titled "System and Method of Personalized Navigation Inside a Business Enterprise," which is a continuation application of U.S. patent application Ser. No. 16/658,951, filed Oct. 21, 2019, issued as U.S. Pat. No. 10,634,506, titled "System and Method of Personalized Navigation Inside a Business Enterprise," which is a continuation-in-part application of U.S. patent application Ser. No. 16/163,708, filed Oct. 18, 2018, issued as U.S. Pat. No. 10,455,364, titled "System and Method of Personalized Navigation Inside a Business Enterprise," which is a continuation-in-part application of U.S. patent application Ser. No. 15/839,298, filed Dec. 12, 2017, issued as U.S. Pat. No. 10,634,503, titled "System and Method of Personalized Navigation Inside a Business Enterprise," which claims the benefit of and priority to under 35 U.S.C. § 119(e) of U.S. Provisional Application No. 62/432,876 titled "System and Method of Personalized Navigation Inside a Business Enterprise," filed on Dec. 12, 2016, the entireties of which patent applications and provisional application are herein incorporated by reference for all purposes.

FIELD OF THE INVENTION

The invention relates generally to systems and methods for providing personalized navigation for people while inside certain business enterprises.

BACKGROUND

A common complaint among shoppers is that they are often frustrated by not knowing where certain items are located within the store. They wander about inefficiently through the aisles searching for items on their shopping list, often retracing steps, taking the long path in their quest of the desired items.

SUMMARY

According to one embodiment, the invention relates to a system for tracking locations of individuals in a building. The system comprises at least one radiofrequency (RF) node disposed near an entrance to the building. The at least one RF node has an RF receiver to receive RF signals from RF-transmitting devices near the entrance to the building. At least one optical device disposed near the entrance to the building, the at least one optical device capturing an image of a plurality of persons while the plurality of persons is near the entrance to the building. A controller is in communication with the at least one RF node to obtain therefrom information associated with the RF signals received by the RF receiver of that at least one RF node and in communication with the at least one optical device to obtain therefrom the captured image. The controller is configured to determine an identity of each RF-transmitting device and an angular position of that RF-transmitting device with respect to each RF node of the at least one RF node based on the information associated with the RF signals obtained by the controller from that RF node of the at least one RF node. The controller is further configured to detect an orientation marker and a plurality of humans in the image obtained by the controller from the at least one optical device and to assign the identity of each RF-transmitting device to one of the plurality of humans detected in the image based on a position of the orientation marker in the image relative to each human detected in the image and on the determined angular position of that RF-transmitting device with respect to each RF node of the at least one RF node. Thereby, each individual is identified who is to be located optically as that individual moves throughout the building.

In one example embodiment, the at least one RF node is configured to determine a relative signal strength indicator (RSSI) value for the RF signals received from each RF-transmitting device. The information obtained by the controller from the at least one RF node includes the RSSI values. The controller is configured to estimate a distance of each RF-transmitting device from each RF node based on the RSSI values for the RF signals received by that RF node from that RF-transmitting device and to use the estimated distance of each RF-transmitting device from each RF node when assigning the identity of each RF-transmitting device to one of the plurality of humans detected in the image.

In another example embodiment, the controller is further configured to detect in the image a mobile phone held by one of the plurality of humans detected in the image and to assign the identity of each RF-transmitting device to one of the plurality of humans detected in the captured image based on the which of the plurality of humans detected in the image is holding the detected mobile phone.

In another example embodiment, the controller is further configured to arrange, for each RF node, the RF-transmitting mobile devices in an angular order based on the angular positions of the RF-transmitting mobile devices from that RF node, arrange the humans captured in the image into an angular order based on relative positions of the plurality of humans detected in the captured image, and compare the angular order of humans detected in the captured image with the angular order of the RF-transmitting mobile devices when assigning the identity of each RF-transmitting mobile device to one of the plurality of humans detected in the captured image. The controller may be further configured to arrange the angular order of the plurality of humans in the captured image to be in respect to the at least one RF node before the angular order of humans detected in the image is compared with the angular order of the RF-transmitting mobile devices.

In yet another example embodiment, the system further comprises a plurality of optical devices disposed throughout the building, and wherein the controller is further configured to optically track each identified individual through the building based on detecting that identified individual in images received from at least some of the plurality of optical devices over time.

In yet another example embodiment, the information carried by RF signals transmitted by a given RF-transmitting mobile device includes a shopping list. The controller may be further configured to determine a route through the building based on items on the shopping list and transmit the route to the given RF-transmitting mobile device for display on a screen of the given RF-transmitting mobile device.

As another example, the system further comprises a plurality of optical devices disposed throughout the building, and the controller is further configured to optically track each identified individual through the building based on detecting that identified individual in images received from at least some of the plurality of optical devices over time.

In other examples, the information carried by RF signals transmitted by a given RF-transmitting mobile device includes a shopping list. The controller may be further configured to determine a route through the building based on items on the shopping list and transmit the route to the given RF-transmitting mobile device for display on a screen of the given RF-transmitting mobile device. The at least one RF node may comprise two or more RF nodes.

In another example, the controller is further configured to compute a location for each RF-transmitting mobile device based on the angular positions of the RF-transmitting mobile devices received from the at least one RF node, to arrange the RF-transmitting mobile devices in a depth order based on the computed locations of the RF-transmitting mobile devices with respect to the at least one RF node, to arrange the humans captured in the image into a depth order based on relative positions of the plurality of humans detected in the captured image, and to assign the identity of each RF-transmitting mobile device to one of the plurality of humans detected in the captured image by comparing the depth order of humans detected in the image with the depth order of the RF-transmitting mobile devices.

According to another embodiment, the invention relates to a method for tracking locations of individuals in a building. The method comprises receiving, by at least one radiofrequency (RF) node disposed near an entrance to the building, RF signals from RF-transmitting mobile devices carried by a plurality of persons near the entrance to the building. An image is captured of the plurality of persons while the plurality of persons is near the entrance to the building. An identity of each RF-transmitting mobile device and an angular position of each RF-transmitting mobile device from each RF node are determined based on information associated with the RF signals received by the at least one RF node. A plurality of humans and an orientation marker are detected in the captured image. The identity of each RF-transmitting mobile device is assigned to one of the plurality of humans detected in the captured image based on a position of the orientation marker in the image relative to each human detected in the image and on the determined angular position of each RF-transmitting mobile device with respect to each RF node, thereby identifying each individual who is to be located optically as that individual moves throughout the building.

In one example embodiment, a relative signal strength indicator (RSSI) value is determined for the RF signals received from each RF-transmitting device, an estimated distance of each RF-transmitting device from each RF node is computed based on the RSSI values for the RF signals received by that RF node from that RF-transmitting device, and the estimated distance of each RF-transmitting device from each RF node is used when assigning the identity of each RF-transmitting device to one of the plurality of humans detected in the image.

In one example embodiment, a mobile phone held by one of the plurality of humans is detected in the image, and assigning the identity of each RF-transmitting device to one of the plurality of humans detected in the captured image is based on the which human detected in the image is holding the detected mobile phone.

In another example embodiment, the RF-transmitting mobile devices are arranged in an angular order based on the angular positions of the RF-transmitting mobile devices with respect to the at least one RF node, and the humans captured in the image are arranged into an angular order based on relative positions of the plurality of humans detected in the captured image, and assigning the identity of each RF-transmitting mobile device to one of the plurality of humans detected in the captured image includes comparing the angular order of humans detected in the image with the angular order of the RF-transmitting mobile devices. The angular order of humans in the captured image may be rearranged to be in respect to the at least one RF node before the angular order of humans detected in the captured image is compared with the angular order of the RF-transmitting mobile devices.

In another example embodiment, a location of each identified individual is optically tracked through the building by comparing successive images that capture that identified individual.

In still another example embodiment, the information associated with the RF signals transmitted by a given RF-transmitting mobile device includes a shopping list. A route through the building may be determined based on items on the shopping list, and the route may be transmitted to the given RF-transmitting mobile device for display on a screen of the given RF-transmitting mobile device.

In yet another example embodiment, radio signals carrying a current location of a given identified individual within the building may are transmitted from the at least one RF node to the RF-transmitting mobile device carried by that given identified individual.

In still another example embodiment, a location for each RF-transmitting mobile device is computed based on the angular positions of the RF-transmitting mobile devices received from the at least one RF node. The RF-transmitting mobile devices are arranged in a depth order based on the computed locations of the RF-transmitting mobile devices with respect to the at least one RF node. The humans detected in the captured image are arranged into a depth order based on relative positions of the humans detected in the captured image. Assigning the identity of each RF-transmitting mobile device to one of the plurality of humans detected in the captured image includes comparing the depth order of humans detected in the image with the depth order of the RF-transmitting mobile devices.

According to another embodiment, the invention relates to a system for tracking locations of individuals in a building. The system comprises at least one radiofrequency (RF) node disposed near an entrance to the building. The at least one RF node has an RF receiver channel to receive RF signals from a plurality of RF-transmitting devices near the entrance to the building. The system further comprises at least one camera disposed near the entrance to the building. The at least one camera captures an image of a plurality of persons while the plurality of persons is near the entrance to the building. A controller of the system is in communication with the at least one RF node to obtain therefrom information associated with the RF signals received by the RF receiver channel of that at least one RF node and in communication with the at least one camera to obtain therefrom the captured image. The controller is configured to determine an identity of each RF-transmitting device and a position of that RF-transmitting device relative to each RF node of the at least one RF node based on the information associated with the RF signals obtained by the controller from that RF node of the at least one RF node, to detect a plurality of humans in the image obtained by the controller from the at least one camera, to detect an orientation marker in the image, and to assign the identity of each RF-transmitting device to one of the plurality of humans detected in the image based on a position of the orientation marker in the image relative to each human detected in the image and on the determined position of that RF-transmitting device relative to each RF node of the at least one RF node.

Still other aspects, embodiments, and advantages of these exemplary aspects and embodiments are discussed in detail below. Embodiments disclosed herein may be combined with other embodiments in any manner consistent with at least one of the principles disclosed herein, and references to "an example", "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Personalized navigation systems according to certain aspects and embodiments use a combination of radiofrequency (RF) technology and optical imaging technology to identify and track persons at business enterprises, and software to provide the persons with individualized information and an individualized navigation experience within the business enterprise. As discussed in more detail below, a person can provide the personalized navigation system with information, such as a shopping list or service request, for example, and receive personalized navigation or other information in response to aid the person in efficiently completing their objective(s) at the business enterprise. In this manner, the person's experience at the business enterprise and can be improved.

According to one embodiment, a personalized navigation system uses RF technology to initially identify a shopper who approaches an entrance to the business enterprise and uses optical technology to detect and track movement of the shopper after the shopper arrives at and enters the business enterprise. To cooperate with the navigation system, the shopper carries a mobile device (e.g., a smartphone or smart watch) with RF transmitting and RF receiving capability. In certain embodiments, the mobile device runs certain application software that transmits RF signals containing an identity of the shopper and the shopper's shopping list. The shopper can acquire the application software and download it to the mobile device from an "app store". Many business enterprises are currently equipped with RF transmitters, RF receivers, and video cameras, and advantageously, the navigation systems described herein do not require any hardware modifications to this existing RF and video equipment.

Figure 1:
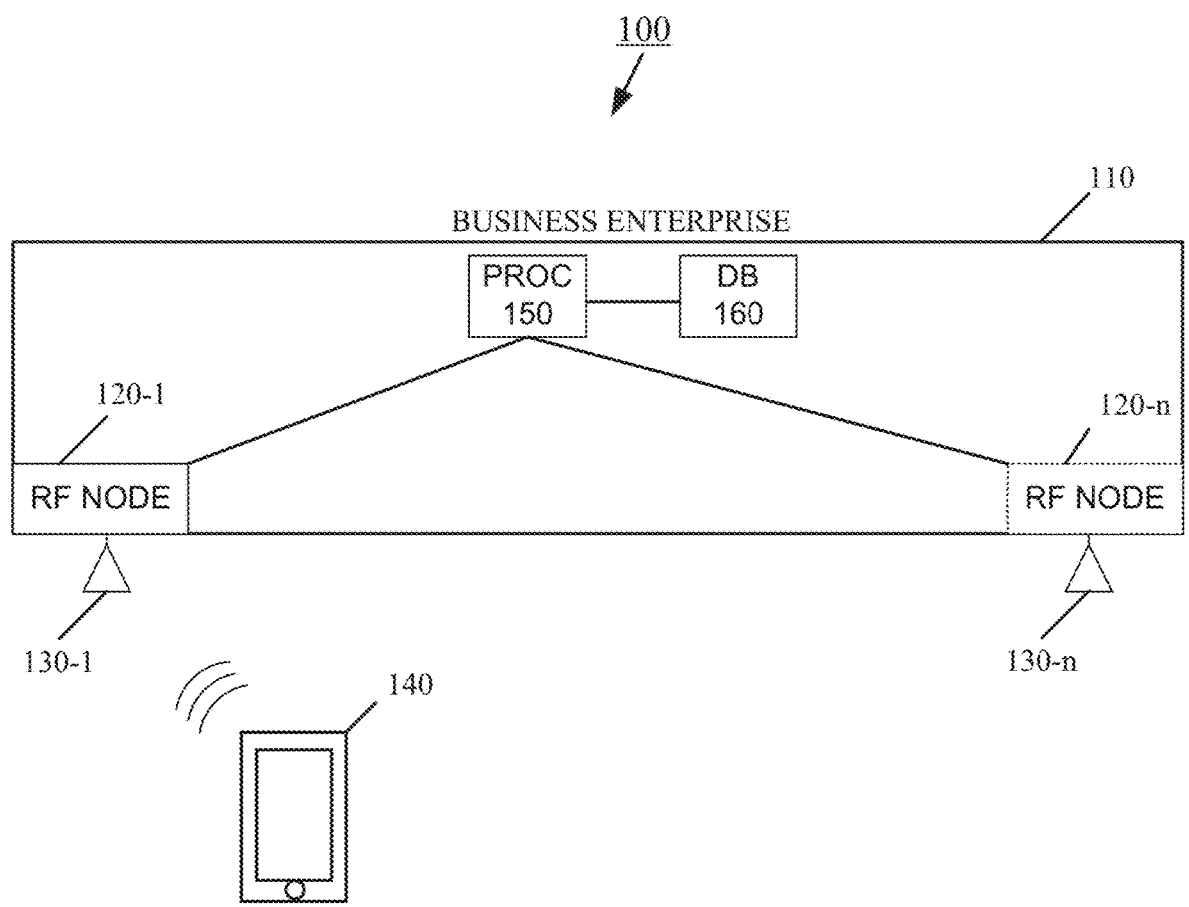
FIG. 1 is a block diagram of an example of a personalized navigation system according to certain aspects of the present invention.

FIG. 1 shows an example of a personalized navigation system 100 configured to operate in a business enterprise 110 with at least one RF node 120. Any number of RF nodes, designated 120-1 to 120-n (n being a positive integer number), may be included. Each RF node 120-1 to 120-n includes a corresponding RF receiver antenna 130-1, 130-n (generally, 130). Optionally, each RF node 120 can also have an RF transmit antenna (not shown). Each RF node 120 can be placed at or near an entrance to the business enterprise 110. Examples of the business enterprise 110 include, but are not limited to, grocery stores, supermarkets, department stores, hardware stores, warehouses, and retail stores. In general, the location of the RF node 120 near the entrance of the business enterprise 110 facilitates detection of an RF-transmitting mobile device 140 associated with a person approaching the entrance, provided that the mobile device 140 is running application software that provides personalized navigation of the business enterprise, as described herein. The mobile device 140 engages in communication with one or more of RF nodes 120 using a wireless communication technology, such as Bluetooth®, Wi-Fi, or Near Field Communication (NFC). If the business enterprise 110 has multiple entrances, with at least one RF node 120 disposed near each entrance, the personalized navigation system 100 can be aware of which entrance the person is entering based on which RF node 120 detects the mobile device 140.

During typical operation, a person with the mobile device 140 approaches an entrance to the business enterprise (i.e., a building) 110. The mobile device 140 runs a personalized navigation app and transmits RF signals. In certain examples the RF signals carry an identifier associated with the person by which an operator of the business enterprise 110 knows the person. For example, the identifier may include the person's name, a telephone number, a rewards program number connected with the business enterprise, or other identifying information. The RF signals may also carry the person's shopping list identifying those items that the person wishes to find upon visiting the business enterprise 110. Typically, the person may prepare this shopping list before visiting the business enterprise 110; however, the shopping list can be constructed or edited at any time before or after the person arrives at the business enterprise 110.

When the person comes into range of an RF receiver antenna 130, the mobile device 140 establishes communications with the RF node 120. In particular, in certain examples the mobile device 140 may pass to the RF node 120 the identifier and shopping list. The mobile device may also or alternatively pass other data to the RF node 120, such as a set of instructions or other information for a technician or similar repair staff performing certain services at the business enterprise 110, for example. In certain examples, the RF node 120 forwards the identifier and shopping list or other data to a computer processing unit (also called a controller) 150, which can use this identifier to access a database 160 where information relating to the person associated with the identifier is kept. This information can include records of prior visits to the business enterprise 110 by the person, for example. Although the computer processing unit 150 and database 160 are shown in FIG. 1 to be within the business enterprise 110, they may reside instead at other sites, such as on a third-party network of computers and servers referred to broadly as "the cloud."

Figure 2:
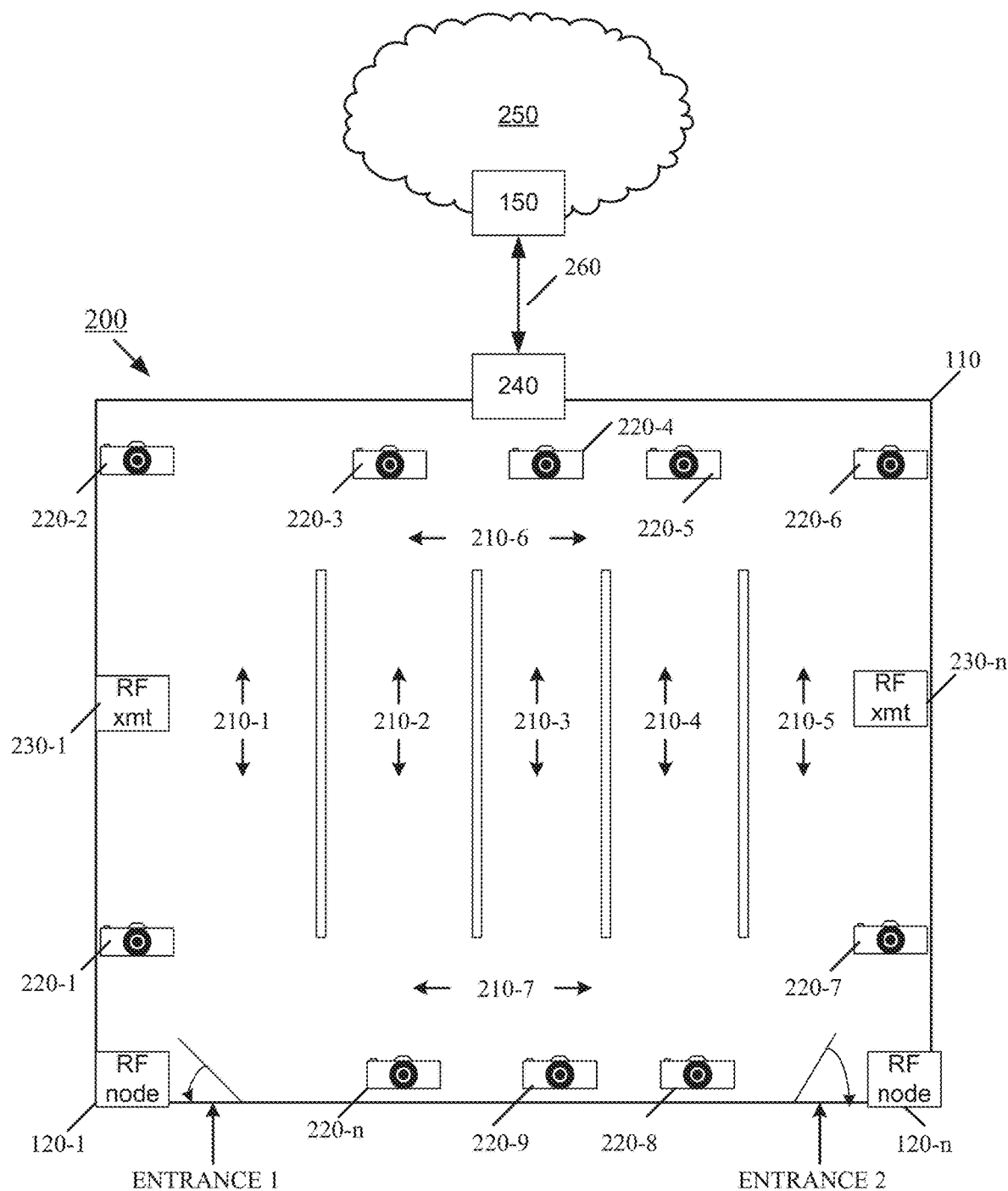
FIG. 2 is a diagram of an example a floor plan of a business enterprise configured with a personalized navigation system according to certain aspects of the present invention.

FIG. 2 shows a simple example of a floor plan 200 of the business enterprise 100 with various aisles 210-1 through 210-7 (generally, 210) and video cameras 220-1 through 220-$n$ (generally 220) placed throughout the store, preferably to provide full coverage of the interior of the business enterprise 100, wherever visitors may walk. The business enterprise 100 can also include one or more RF transmitters 230 and a networking device 240. Each video camera 220, each RF node 120, and each RF transmitter 230 is in communication with the networking device 240 by a wireless or wired communication link (not shown). The networking device 240 is in communication with the computer processing unit 150 (shown in FIG. 1 as discussed above), which in one embodiment resides on the cloud 250. A wired or wireless communication link 260 connects the networking device 240 to the central processing unit 150.

As discussed above, tracking of persons within the business enterprise 110 can be accomplished using optical technology; in particular, by capturing and processing images from the video cameras 220 located throughout the business enterprise 110. According to one embodiment, during typical operation of the personalized navigation system, the video cameras 220 continuously capture images within their fields of view. At least one video camera 220 can be placed proximate each entrance of the business enterprise 110 to acquire images of persons entering the business enterprise. In some embodiments, multiple video cameras 220 can be placed proximate each entrance in such a way as to provide a complete field of view, or at least a functionally sufficient field of view, of the area around the entrance such that images of all persons entering the business enterprise 110 can be acquired. As discussed above, when a person having a mobile device 140 configured to run the application software to engage with the personalized navigation system 110 (referred to as a tracked person) arrives at an entrance to the business enterprise 110 the RF node 120 at that entrance receives the identifier, and optionally other information (such as the shopping list), from the mobile device 140. At the same time, the video camera(s) 220 proximate that entrance capture images of the area around the entrance, and at least some of these images should contain the tracked person. As discussed above, in certain examples, the computer processing unit 150 knows which entrance a person used to enter the enterprise 110 based on which RF node 120 detected the person and known locations of each RF node. Accordingly, the computer processing unit 150 knows which video camera or cameras 220 are in position to capture images of the person. These video cameras 220 pass their captured images to the networking device 240, which sends the captured images to the central processing unit 150. The central processing unit 150 includes an image processor that performs image processing techniques adapted to detect a person within the image and to associate the detected person with the most recently acquired identifier and shopping list.

Techniques for processing images to identify a person within the images are known in the art, and any such image processing techniques can be implemented by the central processing unit 150. For example, the image processor can be adapted to examine images captured by the video camera 220-1 positioned at the relevant entrance for a smartphone in the hand of an individual, which may indicate that the individual is engaging with the personalized navigation system 100. Alternatively, or in conjunction, the image processor can be adapted to examine the captured images for the head or hands of a person. Since the central processing unit 150 expects the next person to fall within the field of view of the video camera 220-1 located at the entrance to be the same as the person who communicated with the RF node 120-1 located at that entrance, that detected person becomes associated with received identifier and shopping list. Once a person has been identified in an image and associated with the received identifier, the personalized navigation system 100 tracks and guides the person as he or she moves through the business enterprise 110.

Tracking can be accomplished by collecting images from the various video cameras 220 located amongst the aisles 210 and processing these images to follow the tracked person. In certain examples the central processing unit 150 follows the movement of the tracked person as her or she moves from one camera field of view to another, dynamically registering and updating the location of the person within the business enterprise 110. In one example the video cameras 120 operate in parallel, with all or some of the video cameras providing images to the central processing unit simultaneously. The images can be merged into a map or layout of the business enterprise 110, such as shown in FIG. 2. In some examples two or more of the video cameras 220 can have at least partially overlapping fields of view, and in other examples different video cameras 220 are used to monitor different areas of the business enterprise 110. The video cameras 220 may capture images with different perspectives. The central processing unit may flatten the images by removing perspective distortion in each of them, and merges the resulting corrected images into the map. Image stitching techniques can be used to merge the images.

In certain examples, an image stitching process first performs image alignment using algorithms that can discover the relationships among images with varying degrees of overlap. These algorithms are suited for applications such as video stabilization, summarization, and the creation of panoramic mosaics, which can be used in the images taken from the cameras 220. After alignment is complete, image-stitching algorithms take the estimates produced by such algorithms and blend the images in a seamless manner, while taking care of potential problems, such as blurring or ghosting caused by parallax and scene movement as well as varying image exposures inside the business enterprise 110. Various image stitching algorithms and processes are known in the art, and any such image processing techniques can be implemented by the central processing unit 150.

A handoff can be made when a tracked person moves from one viewpoint to another or is seen by one camera 220 and not the others. These handoffs may be made using the images running in parallel on the central processing unit 150, with the tracked person's location and movement determined by the central processing unit using whichever camera 220 has the best view of the tracked person.

In certain examples, the video cameras 220 can include depth sensors. In such examples, the image stitching operation can be omitted, and each camera stream data is processed independently for change, person detection and recognition. Then, the resulting "areas of interest" are converted to individual point clouds (described further below) and transformed in to a single common coordinate system. The translation and rotation transformations used for this process are based on the position and orientation of the video cameras (and their associated depth sensors) in relation to one another. In one example, one camera is picked as the main sensor and all other camera data is transformed into the main coordinate system, achieving the same end result as the image stitching procedure, namely, unification of the actual location of the tracked person among sensors.

In some examples the central processing unit 150 may use known information about the floor plan of the business enterprise to assist with identifying and tracking persons based on the images acquired from the video cameras 220. For example, the central processing unit can use known shapes and positions of shelving along the aisles 210 to provide reference points. At times, a tracked person may be occluded in a camera's field of view, for example, by another person, equipment, or shelving. The personalized navigation system 100 can be configured to store the tracked person's prior-determined position and compare multiple image frames to relocate the tracked person after a temporary occlusion. As discussed further below, the personalized navigation system 100 can be configured to provide a proposed route for the tracked person through the business enterprise 110, and therefore the central processing unit can use a predicted future location of the tracked person to relocate the person after a temporary occlusion.

According to certain embodiments, the central processing unit 150 can run an image-processing process, optionally supplemented with depth information, to track a person as discussed above. A two-dimensional (2D) optical image capture device (i.e., a video camera 220) with a single aperture is capable of capturing 2D image information on a plane (film, CCD, etc.). To acquire three-dimensional (3D) information typically requires acquisition of additional data. Three-dimensional data can be acquired using multiple video cameras 220 or by combining one or more video cameras with one or more depth sensors. The video cameras 220 can utilize visible light, infrared light, or other optical wavelength ranges. Depth sensors can be based on infrared, laser or other wavelength emitters that transmit light to an object. Depth sensors typically determine the distance to the object from which the light that is reflected or backscattered. Alternatively, depth sensors can utilize acoustic signals to determine distance. In one embodiment, depth sensing is integrated into the video cameras 220.

Image frames are acquired from the video cameras 220. A video camera system with depth sensing capability typically outputs video (e.g., RGB, CYMG) and depth field information. Video may optionally be encoded to a well-known format, such as MPEG. The optical and depth information are stitched together. Open libraries such as OpenCV or OpenNI (used to capture depth images) enable the optical and depth information to be stitched together. Alternatively, a user of the personalized navigation system 100 may develop customized software for generating 3D information or object data generated by optical images and depth sensors.

An initial calibration can be performed over multiple image frames to determine background information both for 2D optical images and the depth sensing. During the calibration, any motion (e.g., people) is extracted or ignored during background extraction until stable background optical (RGB) and depth information can be stored, for example, in the database 160. Calibration may be performed periodically or may be initiated by the personalized navigation system 100, for example, if errors are detected.

After calibration is complete, the resulting spatial filter masks can be used to extract an "area of interest" for each video camera 220. For example, for a video camera located near an entrance to the business enterprise 110, the area of interest may correspond to the area between the background and a foreground (area where a person is expected to be), so that everything that is not walls, doors, or other infrastructure (for background) and also not a detected person, is ignored. This ignoring of the background and foreground focuses on data within the depth threshold of the area of interest being monitored. Alternatively, the "area of interest" can include a different part of the scene, for example, the foreground in order to see where the person is in later recognition steps and can be expanded or contracted as system requirements dictate. In general, the area of interest applies to any cut-out of a scene that is to be the focus within which to perform person tracking.

According to certain embodiments, multiple image frames (e.g., N−1 and N) are obtained and compared, and in certain examples the image frames can include depth information in addition to RGB (color) data, as discussed above. Image and depth information can be filtered for noise and then processed to determine if a difference between two frames exists. This can be done with edge detection, threshold and difference algorithms, or other image processing techniques. In certain examples, information from the depth sensors is also processed to compare image frames. The system can use changes between image frames, in particular, changes in the position or orientation of a detected person, to track the movement of the person. In some embodiments, change detection can be limited to the area of interest to increase processing speed.

In one embodiment, when the area of interest is determined, a "point cloud" is generated using the video camera's extrinsic and intrinsic parameters through algorithms for "2D to 3D" data representation conversion preformed on the RGB and/or depth images obtained and processed through OpenNI and OpenCV. In one embodiment, the Point Cloud Library may be used. The object shape and location information generated from the Point Cloud Library are used to identify and track a person in three dimensions using edge detection, color detection, object recognition and/or other algorithms for determining the presence of a person within the scene. If object information is in the shape of a human, for example, then the process continues to track the person. However, if the size, shape or other appearance information indicates that the object is not a person, subsequent image frames can be analyzed until a person is detected. In some examples, images captured by the video cameras 220 may include more than one person. Accordingly, the process may compare expected features and/or appearance attributes of the tracked person with persons detected in the image frames to continue to track the correct person.

As discussed above, the central processing unit 150 can merge the acquired images from the video cameras 220 into a map to be able to track identified persons as they moved through the business enterprise. In certain examples, the application software running on the mobile device 140 can be configured to display the map or a similar map view or virtual layout of the floor plan of the business enterprise 110, such that the tracked person can view their location within the business enterprise. The central processing unit 150 can send commands to the RF transmitters 230—by way of the networking device 240—to transmit RF signals carrying the updated location of the tracked person, which can be determined using image processing techniques as discussed above. The mobile device 140—with its RF receiver— receives these signals and registers the updated location of the person within the application software, which can show the location of the person within the virtual layout of the business enterprise 110 displayed on the mobile device 140.

Figure 3:
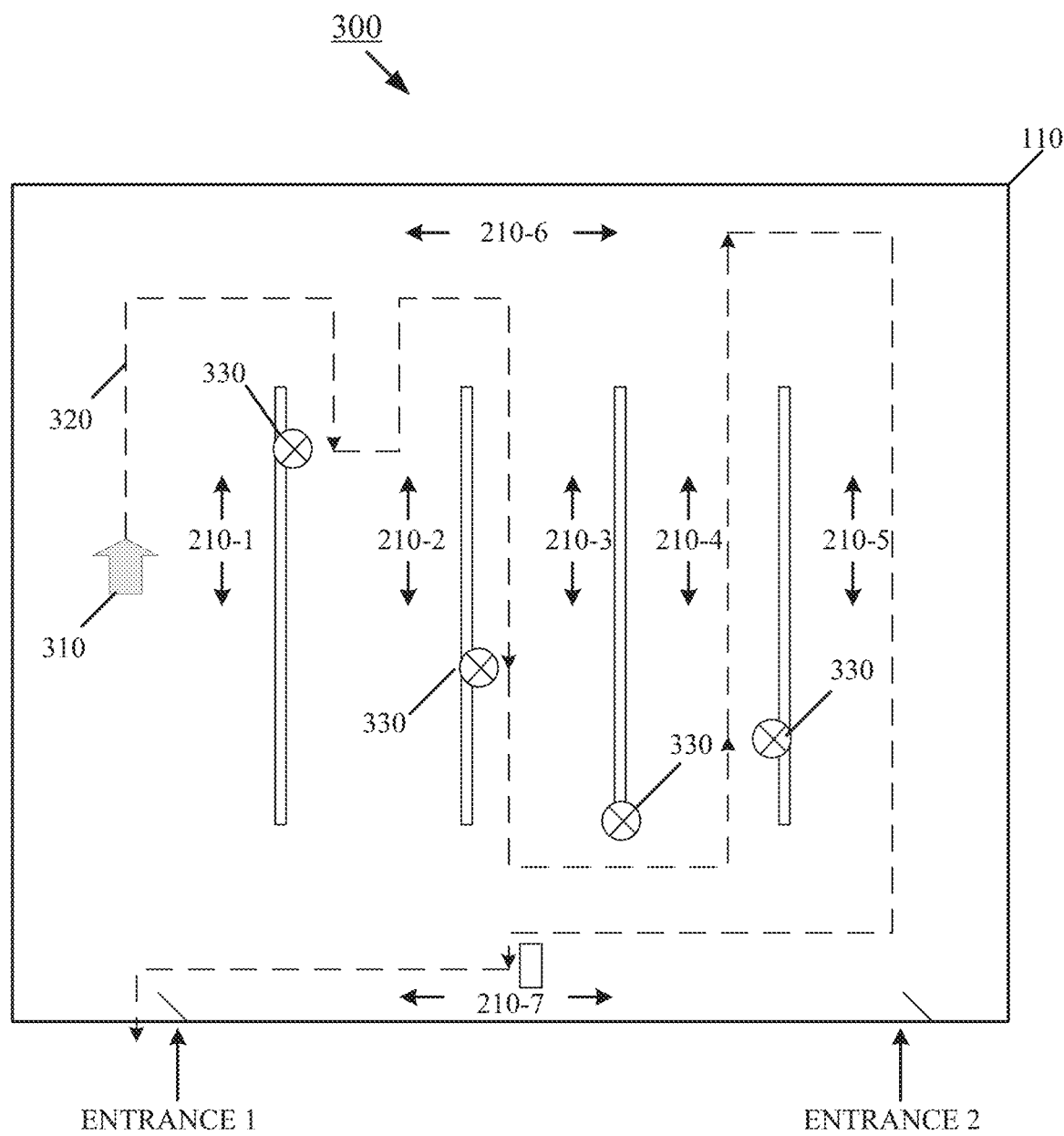
FIG. 3 is an example display of the floor plan of the business enterprise as it may appear on the screen of the mobile device carried by the shopper according to certain aspects of the present invention.

FIG. 3 shows an example display 300 of the floor plan of the business enterprise 110, with aisles 210, as it may appear on the screen of the mobile device 140 (FIG. 1) carried by the tracked person. In this example, an arrow 310 indicates the current location of the tracked person. As discussed above, the personalized navigation system 100, and the application software running on the mobile device 140, can be configured to guide the tracked person through the business enterprise based on the information received along with the identifier. For example, where a shopping list is provided, the personalized navigation system 100 can access information from the business enterprise 110 that identifies where in the aisles 210 the items on the shopping list are located. In one example, the central processing unit 150 (FIG. 1, FIG. 2) examines the shopping list acquired by the initial RF communications with the mobile device 140 and accesses a database that stores the locations of all items within the business enterprise 110. The central processing unit can be further configured to match descriptions of items on the shopping list with product SKUs or other identifying information in the database to obtain a location of each item within the business enterprise 110. The database can be part of the personalized navigation system 100, obtained from an operator of the business enterprise 110 and regularly updated, or the database can be maintained by the operator of the business enterprise and accessed by the personalized navigation system (e.g., by the central processing unit 150) via the cloud 250.

In FIG. 3, a directional dashed line 320 identifies a proposed route through the business enterprise 110. After the central processing unit 150 has examined the shopping list and identified where the desired items 330 on the shopping list are located within the business enterprise 110, a route 320 is proposed through the business enterprise for efficiently obtaining the items. In one embodiment, the route is based on the shortest distance to acquire all the items. Another route can be to direct the person to non-perishable or unrefrigerated items initially, and leaving perishable or refrigerated items for the end of the route. The central processing unit 150 sends the map and item location information to the mobile device 140 via the RF transmitters 230 (FIG. 2). The application software executing on the mobile device 140 displays the route 320 based on the items on the tracked person's shopping list. To supplement the positioning information and calibration provided by the video cameras, the mobile device 140 can have inertial sensors. Techniques for using inertial sensing to enhance positioning information are described in U.S. Pat. No. 8,957,812, issued Feb. 17, 2015, titled "Position Tracking System and Method using Radio Signals and Inertial Sensing," the entirety of which U.S. patent is incorporated by reference herein. In other examples, additional RF nodes (similar to the RF nodes 120) with RF transmitting/receiving capability can be used to supplement the positioning information provided by the video cameras and enhance the tracking capability of the personalized navigation system 100.

In addition to identifying the desired items 330, the central processing unit 150 can notify the person of an item that may be of interest, as the person's current location approaches the location of that item, even if that item is not on the shopping list. Such an advertisement may be based on the shopping history of the person, for example. As discussed above, in certain examples the information provided from the mobile device 140 to the RF node 120 (and therefore to the central processing unit 150) can include a service request. Accordingly, in such examples instead of or in addition to displaying the locations of the desired items 330, the location of the service desk or other relevant information can be displayed on the map, and the route 320 can be configured to guide the person to that location.

Figure 4:
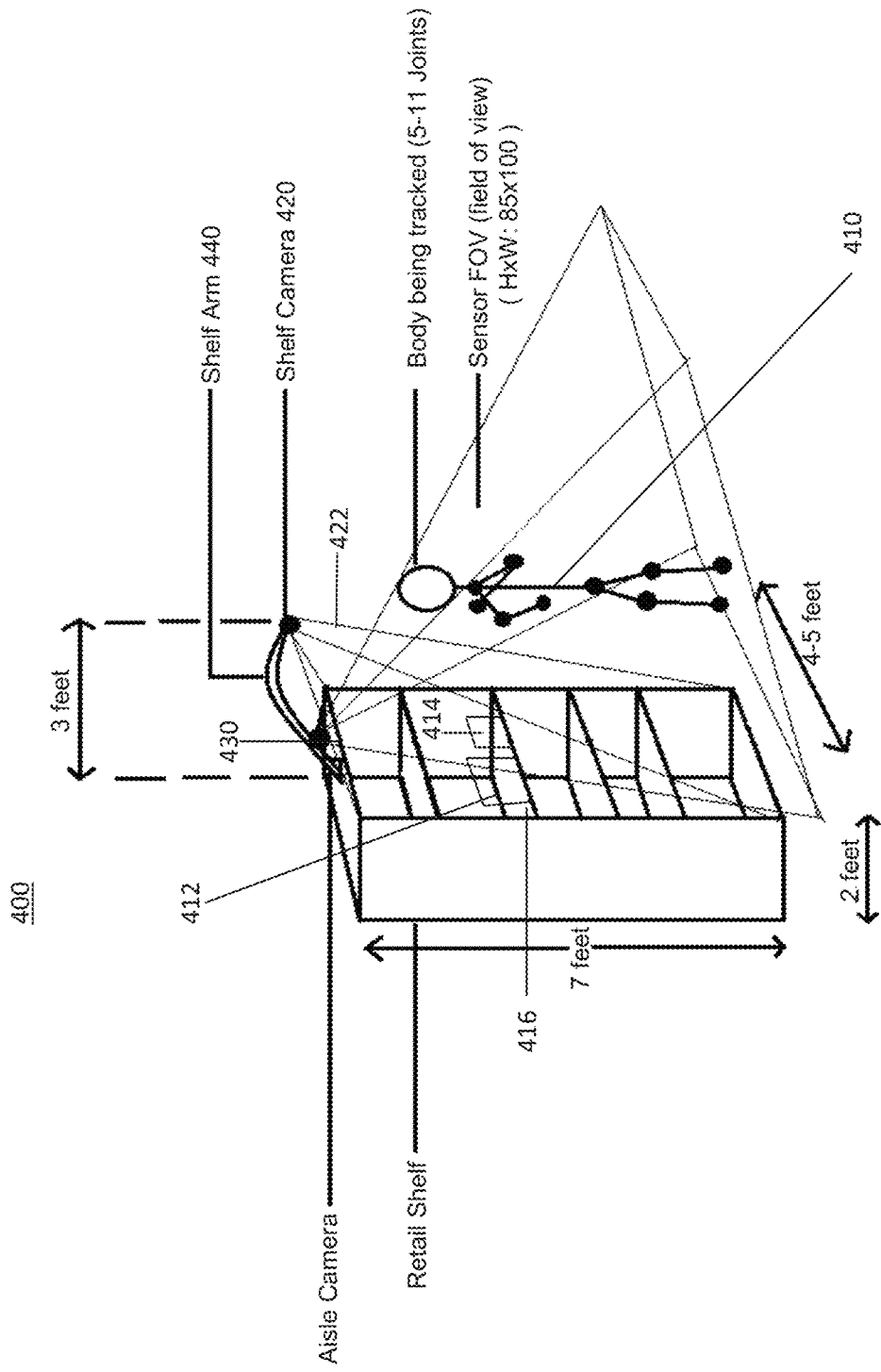
FIG. 4 is a diagram illustrating an example of a system including a shelf camera and an aisle camera tracking a shopper in front of a retail shelf within the business enterprise, according to aspects of the present invention.

Referring to FIG. 4, another aspect of this disclosure is a product tracking and checkout system 400 that can keep track of products taken by customers as they shop in the business enterprise 110, integrating with the person's shopping list and also eliminating the need for shoppers to wait in cashier lines. This system 400 enables customers 410 to any or all of take products 412, 414 off of the shelves 416, put them in their cart, register the products that are taken and who took the products, automatically pay for the products and leave the store with the products purchases automatically logged by the retail system without having to go through a checkout system. Aspects of this system could improve the speed and experience of the shopping process for customers and reduce the cost of cashiers for the retailers.

For example, retailer's costs can be reduced with a system in place that automatically keeps track of inventory on shelves and/or what is taken off these shelves by customers to automatically keep track of what customers take from stores and to manage inventory on shelves. The ability to track inventory and what products customers remove from shelves can improve the cost basis for retailers by eliminating the need for cashiers or extra staff to constantly go to shelves to inspect what items need replacing and re-stocking. In addition, the system can update the shopping list received from a tracked person based on items founds and taken by the tracked person and update the displayed route 320 based on the progress made by the tracked person.

It is appreciated that variations of image processing can be used for shelf and product tracking. One aspect of the system 400 includes a product recognition camera 420 facing the shelves to view what products are on the shelf and what products are removed by customers. The system may have one or more first shelf facing cameras 420 with a view angle 422 focused on the shelf to see what products are there and what products are removed. However, there may also be situations where one or more shelf focused product recognition cameras 420 may not be sufficient as there may be times that two people reach for products in the same area, potentially even cross arms while reaching for their individual products, and/or possibly blocking the view of the one or more product tracking cameras 420 when reaching and grabbing the product on the shelf.

Thus, an embodiment of the system incorporates an additional outward looking (aisle facing) camera 430. Thus, an aspect of this embodiment of the system includes at least two cameras on an integrated arm mount 440. At least one first product tracking camera 420 is oriented to focus on the products on the shelf and at least one second aisle tracking camera 430 is oriented to focus on the aisle and the customers doing the shopping. Both cameras can be a video camera, and both cameras can be a video camera of the video cameras 220-1 through **220-*n* (generally 220) placed throughout the business enterprise, as discussed above, to provide full coverage of the interior of the business enterprise 110. Thus, in this embodiment, at least one camera 420 ("shelf tracking camera") may be used primarily for product recognition on the shelf and at least one additional camera 430** ("aisle tracking camera") may be used primarily for customer skeletal tracking to confirm where that customer is reaching.

Some advantages of this embodiment of the system 400 are that by using at least one aisle tracking camera 430 to focus into the aisle and on the shopper, the system can eliminate any occlusion issues from the shopper standing in front of the shelf-facing camera 420 or any of the other video cameras 220. In addition, the combination of the first shelf facing camera 420 and second aisle facing cameras 430 can also prevent the cameras from confusing what item was taken should two shoppers reach in the same area for products and either cross arms or occlude the camera potentially causing the system to charge the wrong customer for the item taken.

Aspects of this embodiment of the system 400 having the dual cameras can include accomplishing multiple functions from at least one first camera 420 and at least one second camera 430 including shopper registration, shopper movement tracking, and product identification on retail shelving, inventory tracking, and monitoring the amount of products on the shelving.

Typically, multiple persons may be entering and/or leaving the entrance of an enterprise at a given moment. Further, more than one of them may be operating an RF-transmitting mobile device at that moment, and an RF node of the personalized navigation system, located near the entrance, may be in communication with a plurality of them. In addition, others passing through or near the entrance at that moment may not be carrying a mobile device or may have their mobile devices are turned off. Personalized navigation systems described herein are configured to distinguish between people participating in the personalized navigation and between participants and non-participants. Unlike participants, non-participants are not interacting through RF communications with the personalized navigation system, but like participants, non-participants may still be optically tracked through the enterprise.

It is appreciated that aspects of the cameras and the system can also include color sensing, comparison and depth sensing, which can be accomplished for example with infrared sensing. The first shelf tracking camera 420 can use either or both of color and depth sensing to register the products' position and to recognize the actual products on the shelf. The second aisle tracking camera 430 can use depth sensing to perform skeletal tracking to confirm where that customer is reaching. Confirmation of which customer selected which product on the shelf is achieved by the shelf camera 420 providing product identification and removal (from shelf) detection and by the position of the person's arm in relation to the item and, upon removal, the item actually in the hand of the customer provided by the aisle camera 430. The fusing of the functions of these two cameras provides a much more robust method for confirming what was taken off the shelf and by which shopper.

Figure 5:
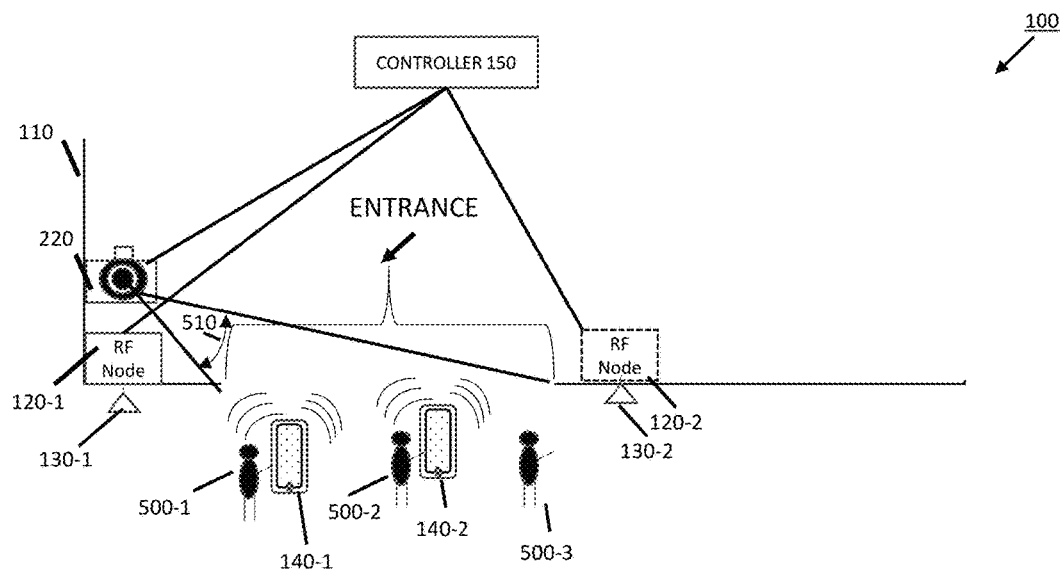
FIG. 5 is a diagram illustrating an example of a personalized navigation system configured to distinguish among multiple persons disposed at the entrance of the business enterprise.

FIG. 5 shows an embodiment of a personalized navigation system 100 configured to distinguish among individuals who pass through an entrance of the business enterprise 110 concurrently or next to each other. Near the entrance are located one or more RF nodes 120-1, 120-2 (generally, 120) and one or more cameras 220 (only one shown to simplify the drawing). Each RF node 120 has a corresponding RF receiver antenna 130-1, **130-*n* (generally, 130) and an RF transmitter (not shown). In one embodiment, each RF node 120** has an antenna array comprised of two or more antennae (or antenna elements) with known spatial separation(s). Timing differences between the RF signal received at each of the at least receiver antennae are used by the RF node to estimate angle of arrival of the RF signal. An example of a multiplexing technique for multiplexing antenna of an antenna array is described in U.S. Pat. No. 8,749,433, issued Jun. 10, 2014, titled "Multiplexing Receiver System", the entirety of which is incorporated by reference herein.

Each RF node 120 and each camera 220 is in a fixed location and in communication with the controller 150, which knows the relative locations of each such electronic equipment (i.e., the pan and tilt angles and distance between cameras 220, between RF nodes 120, between each camera 220 and each RF node). Each camera 220 has a field of view 510 that covers an area near the enterprise entrance. As previously described, the controller 150 is configured to detect a person within an image captured by the camera(s) 220 and associate the detected person with an identifier that was transmitted by the person's mobile device and recently received by the RF node.

As illustrated in FIG. 5, multiple persons 500-1, 500-2, 500-3 (generally, 500) are concurrently near the enterprise entrance (whether entering or leaving). Individuals 500-1 and 500-2 are carrying RF-transmitting mobile devices 140-1, 140-2, respectively. Each mobile device 140-1, 140-2 is running application software that provides personalized navigation of the business enterprise, as previously described, and is in communication with one or more of RF nodes 120-1, 120-2 using a wireless communication technology, such as Bluetooth®, Wi-Fi, or Near Field Communication (NFC). This application software may be running in the background, that is, the individual does not need to deliberately activate the application to handshake with an RF node; the application is in the background broadcasting or listening for join requests. By operating the application in the background, the mobile device 140 automatically connects with each RF node 120 upon coming into wireless communication range of it. To synchronize communications, each mobile device 140 handshakes with each RF node 120 with which it is in communication. In this example, the individual 500-3 is not carrying or not running a mobile device that is in RF communication with an RF node 120. The camera(s) 220 capture images that include all these individuals 500-1, 500-2, 500-3; that is, the controller may detect all the individuals 500-1, 500-2, 500-3 in a single captured image. As described herein, the controller 150 is configured to determine which received identifier corresponds to which person detected in the captured image, and which detected person does not have or is not using an RF-transmitting mobile device to communicate with the RF node 120.

Figure 6:
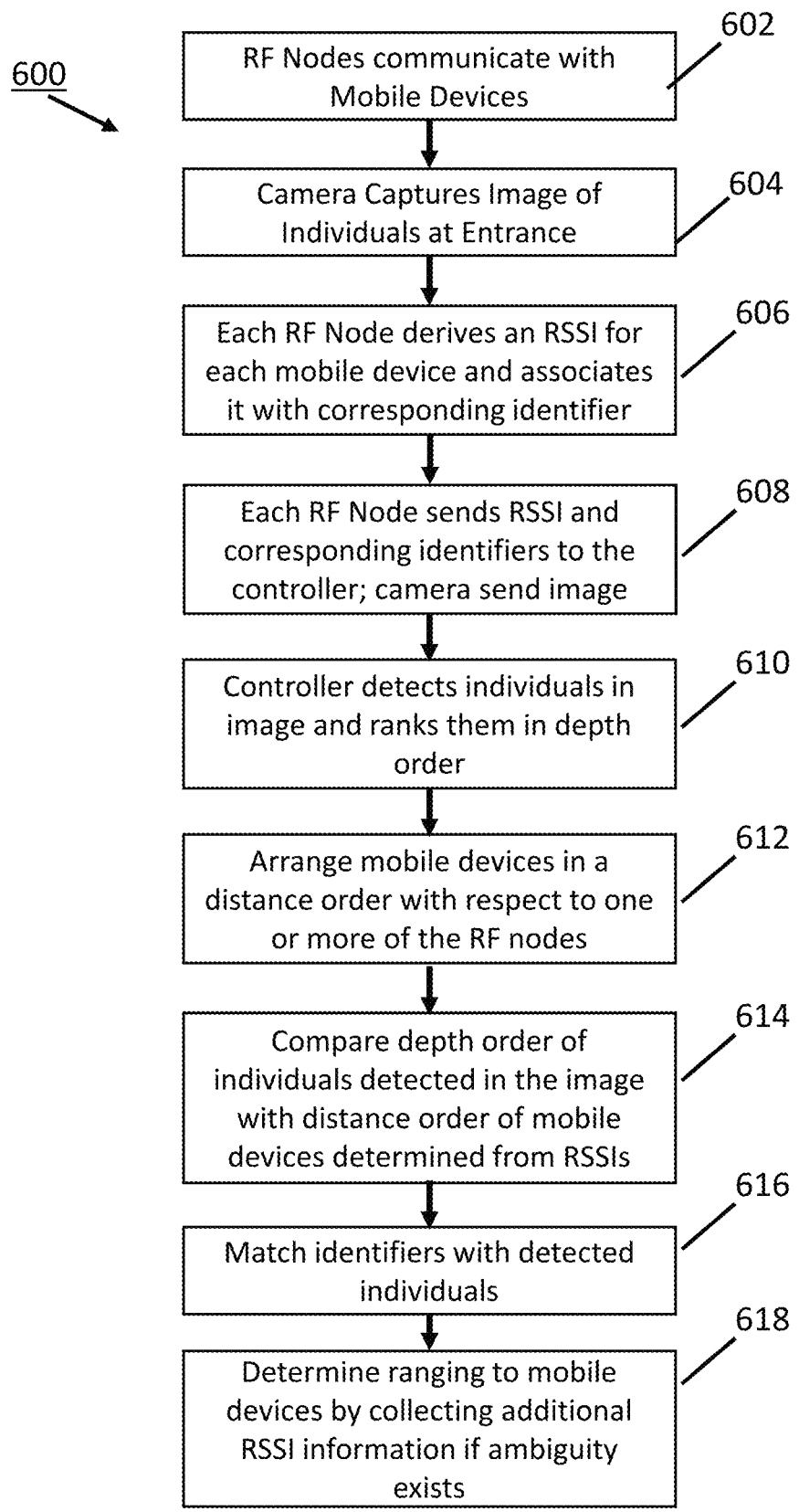
FIG. 6 is a flow diagram of an embodiment of a process for distinguishing among multiple persons located at the entrance of the business enterprise.

FIG. 6 shows an embodiment of a process 600 for distinguishing among multiple persons located at the entrance of the business enterprise, at least one of which is carrying and operating an RF-transmitting mobile device. For purposes of illustration, consider that the individuals 500-2 and 500-3 pass through the entrance side-by-side and continue further indoors, whereas individual 500-1 pauses just within the entrance. The mobile devices 140-1, 140-2 of the individuals 500-1, 500-2, respectively, communicate (step 602) with the RF nodes 120-1, 120-2, sending them their identifiers, and, at about the same time or momentarily after, the camera 220 captures (step 604) an image with all three individuals in it.

Each RF node 120 derives (step 606) a received signal strength indicator (RSSI) for the radio signal received from each mobile device 140 and associates that RSSI measurement with the corresponding identifier. In general, the closer the mobile device is to the RF node 120, the stronger is the received signal. At step 608, the RF nodes send the RSSI measurements and associated identifiers, and the camera sends the captured image, to the controller. The controller associates the captured image with the RSSI measurements and associated identifiers because of the near synchronicity of when the camera captured the image and the RF nodes received the RF signals. The controller also knows the relative locations of the RF nodes to each other and to the camera and tracks which RF node sent which RSSI values.

At step 610, the controller detects the three individuals in the image and establishes a depth order of the detected individuals with respect to the camera. This determination of depth order may use depth information obtained by the camera or by a depth sensor calibrated to the camera. The controller can rearrange the depth order of humans in the image from the perspective of or in respect to each RF node, thus facilitating a comparison of that RF node's distance order, which is based on its computed RSSI values, with the depth order derived from the image captured by the camera.

In this example, the controller receives the RSSIs and identifier information for only two mobile devices. The task of the controller is to match each identifier with the proper mobile device, that is, with the appropriate one of the individuals detected in the image.

From the received signal strength indicators, the controller can compute approximate distances to the RF-transmitting sources (i.e., the mobile devices). The greater the number of RF nodes that provide RSSI values, the more precisely the controller can estimate the location of each mobile device with respect to those RF nodes (e.g., through triangulation or multilateration). Alternatively, the controller can deduce a closest-to-farthest order for the mobile devices based on their corresponding RSSI values, without computing relative location or distance estimates. The controller arranges (step 612) the RF-transmitting mobile devices in distance order with respect to the RF node 120-1 and with respect to the RF node 120-2.

Using the known locations of the RF nodes 120-1, 120-2 and the camera 220 and camera angles, the controller compares (step 614) the depth order of the persons detected in the image with the distance order(s) determined for the mobile devices based on the signal strength indicators provided by the RF nodes 120. Based on the comparison, the controller matches (step 616) identifiers with the detected individuals.

For example, based on the example locations of the individuals 500 in FIG. 5, the RF node 120-1 determines that the signal strength of the mobile device 140-1 is greater than that of the mobile device 140-2, whereas the RF node 120-2 finds the opposite is the case. For example, the controller may compute from the RSSI values that the mobile device 140-1 is approximately 6 feet away from the RF node 120-1 and approximately 9 feet away from the RF node 120-2 and that the mobile device 140-2 is approximately 11 feet away from the RF node 120-1 and approximately 4 feet away from the RF nodes 120-2. Accordingly, from the computed estimated distances, a distance order for mobile devices with respect to each RF node emerges; the controller 150 thus finds that the mobile device 140-1 is closer to the RF node 120-1 than is the mobile device 140-2.

Further, in the captured image, the controller detects three people and can determine a relative distance from the camera of each person. Depth information associated with the image can help with this relative distance determination. Because the locations of the RF nodes 120-1, 120-2 relative to each camera and to each other are known, the controller can then provisionally assign identifiers to individuals (i.e., presumably, the mobile device carrying persons). The RSSI values, any signal-strength-based distance calculations, distance orders for mobile devices, and the depth information associated with humans detected in the image, guide these assignments. Other information can further enhance the decision-making process. For instance, the entrance may be sixteen feet in width, which provides an approximate upper bound for possible distances of people from the camera and from the RF nodes and helps establish the locations of persons passing through entrance. The controller can also consider detected gaps in the image between adjacent individuals. Other indicators, such as orientation markers deliberately placed and calibrated within the camera(s)' field of view, such as on a wall or shelf that is above or on either side of the entrance, can assist the determination. Fixed features inherent to the enterprise, examples of which include but are not limited to a pillar, beam, airduct, ceiling tile, pipe, window, door, shelf, and counter, can serve as orientation markers. As another example, the RF node(s) can fall within the camera's field of view at the entrance, and the camera can thus capture the RF node in the same image that captures the plurality of individuals 500. During the image processing, the controller can then use the RF node's location in the image as an orientation point to help determine the location each detected human relative to the RF node.

Further image processing of images captured by the camera can also be employed to resolve any ambiguity. For instance, the controller can attempt to detect mobile devices in the hands of the detected individuals. Detecting a cell phone in one's possession, however, is not conclusive, as the phone may be turned off or it may not be communicating with the personalized navigation system. In addition, not detecting the cellphone in one's possession is likewise inconclusive, for an operating RF-transmitting mobile device phone may be concealed in a person's handbag or pocket. Such information, notwithstanding its inconclusive nature, can be used to increase the confidence level of a correct matching of mobile phones to humans detected in an image.

Based on all its available information, the controller can assign, for example, the mobile device closest to the RF node 120-1 to the person 500-1 in the image closest to the camera, and the mobile device farther from the RF node 120-1 to the person 500-2 next in the image closest to camera. If ambiguity remains (i.e., a confidence level for correct matching does not exceed a threshold), for example, because not all individuals are carrying RF-transmitting mobile devices, such as individual 500-3, or because individuals are walking close to each other, the controller may collect (step 618) additional RSSI information from multiple RF nodes 120-1, 120-2 to determine 2-dimensional range information to each of the mobile phones. Again, the greater the number of RF nodes, the more accurate this range determination. This approximate directional information can be used to calibrate the location of the smartphone-toting individuals within the captured images and distinguish them from an individual who is not carrying a smartphone.

The RSSI measurements from a single RF node (e.g., 120-1) may be enough for the controller to determine relative distance among the mobile devices from that RF node and find the proper match to a human detected in the image. Because the distances from the camera to the RF node, from the RF Node to each mobile device based on RSSI values, and from the camera to each detected human based on depth information, are pre-known or computed, the controller can compute approximate locations of each mobile device and match them to the humans detected in the image. As previously described, other visual orientation markers and/or subsequent visual and RF tracking (via subsequent RSSI information) can aid in the determination.

Figure 7:
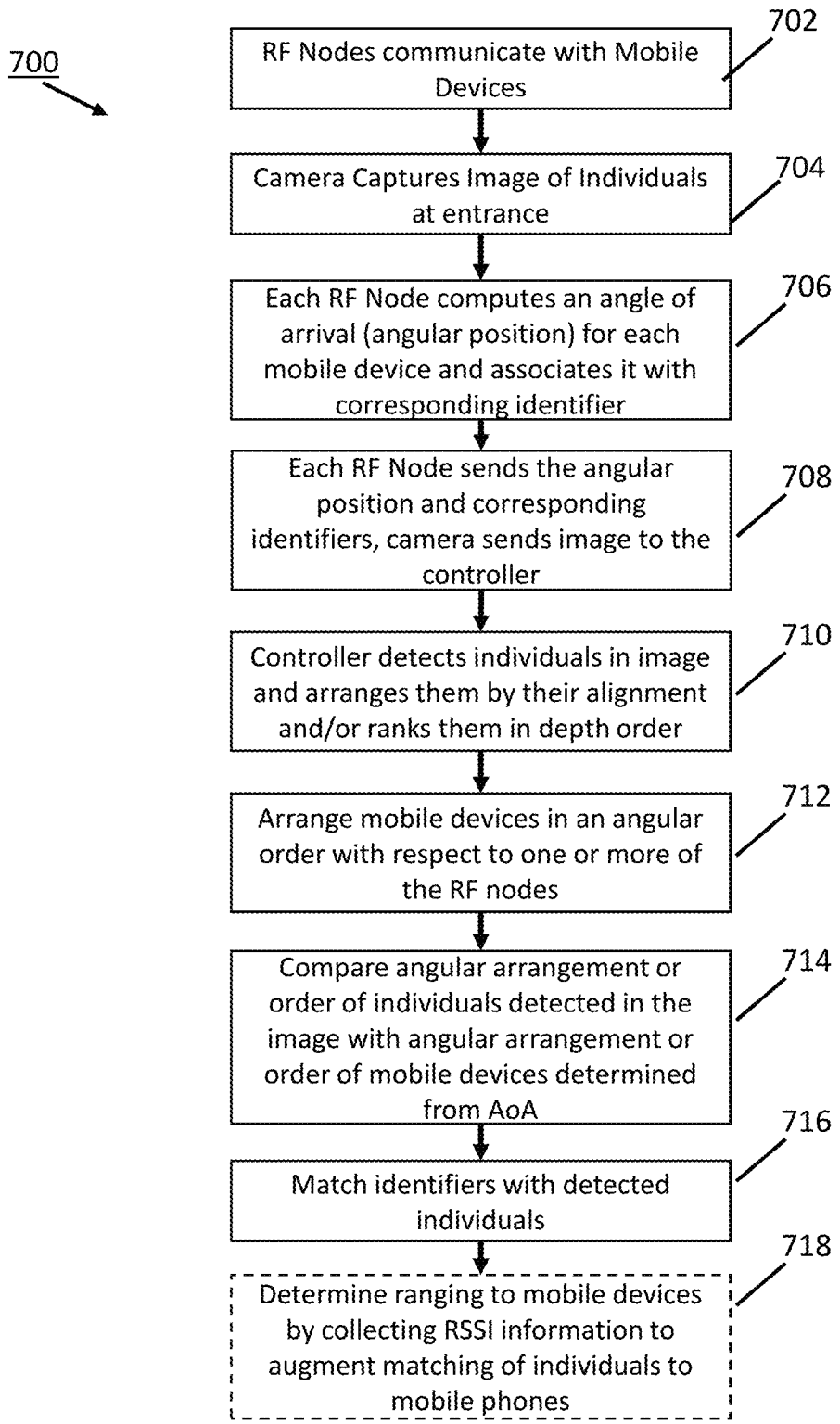
FIG. 7 is a flow diagram of another embodiment of a process for distinguishing among multiple persons located at the entrance of the business enterprise.

FIG. 7 shows an embodiment of another process 700 for distinguishing among multiple persons located at the entrance of the business enterprise. At least one of the people is carrying and operating an RF-transmitting mobile device that runs the aforementioned application software (either as a foreground or background service) to communicate with the RF nodes 120 of the business enterprise. For purposes of illustration, consider that the individuals 500-1, 500-2, and 500-3 (FIG. 5) are near the entrance. The mobile devices 140-1, 140-2 of the individuals 500-1, 500-2, respectively, communicate (step 702) with the RF nodes 120-1, 120-2, sending them their identifiers, and, at about the same time or momentarily after, the camera 220 captures (step 704) an image with all three individuals in it.

For this process, each RF node 120 has an antenna array and estimates (step 706) an angle of arrival for the radio signal coming from each mobile device 140 and associates that angle of arrival measurement with the corresponding identifier. Each RF node 120 can determine the direction of a RF signal incident on the antenna array by measuring the time difference of arrival (TDOA) of the RF signal at individual antenna of the antenna array. An RF node can make this TDOA measurement by measuring phase difference in the RF signal received by each antenna or antenna element in the antenna array. From these time differences, the RF node can calculate the RF signal's angle of arrival. As used herein, this angle of arrival corresponds to an angular position or angle line for the RF signal source, namely, the mobile device 140. Having angular position data for a given mobile device at two (or more) RF nodes 120 enables computation of an intersection point that corresponds to the location of that mobile device. Approaches other than TDOA for calculating angle of arrival are known in the art and may be used without departing from the principles described herein.

At step 708, the RF nodes send the calculated angle of arrival (i.e., angular position) measurements and their associated identifiers, and the camera sends the captured image, to the controller. The controller associates the captured image with the angular position measurements and associated identifiers because of the near synchronicity of when the camera captured the image and the RF nodes received the RF signals. The controller also knows the relative locations of the RF nodes with respect to each other and to the camera and tracks which RF node sent which angular position measurements.

At step 710, the controller detects the three individuals 500-1, 500-2, 500-3 in the image and determines an angular alignment and/or depth order of the detected individuals with respect to the camera. The angular alignment corresponds to a left-to-right or right-to-left appearance of the individuals in the image. For example, from the perspective of the camera, individual 500-2 is between individuals 500-1 and 500-3 in the image, with individual 500-3 being on the left of individual 500-2 and individual 500-1 on the right of individual 500-2. The determination of depth order may use depth information obtained by the camera or by a depth sensor calibrated to the camera.

The controller can rearrange the angular alignment and/or depth order of humans in the image to be from the perspective of or in respect to each RF node. This rearrangement facilitates comparing the angular alignment of individuals in the image with the angular alignment of the mobile devices according to the angular positions determined by that RF node.

In this example, the controller receives the angular positions and identifier information for only two of the three mobile devices 140-1, 140-2 (FIG. 5) captured in the image. The task of the controller is to match each identifier with the proper mobile device, that is, with the appropriate one of the individuals detected in the image.

From the received or computed angular positions, the controller can compute approximate locations of the RF-transmitting sources (i.e., the mobile devices). The greater the number of RF nodes that provide angle of arrival or angular positions, the more precisely the controller can estimate the locations of each mobile device with respect to those RF nodes (e.g., through intersection of angle lines from two RF nodes or through triangulation or multilateration with angle of arrival lines from three or more RF nodes).

Alternatively, or in addition, the controller (step 712) can deduce a left-to-right (or right-to-left) arrangement for the mobile devices based on their corresponding angular positions, without computing relative location or distance estimates. For example, based on the angular positions computed by the RF nodes 120-1, 120-2, the controller determines the mobile device 140-2 to be on the left of mobile device 140-1 from the perspective of the RF node 120-1 and determines the mobile device 140-2 to be on the right of mobile device 140-1 from the perspective of the RF node 120-2.

Using the known locations of the RF nodes 120-1, 120-2 and the camera 220 and camera angles, the controller can compare (step 714) the angular alignment of the persons detected in the image with the angular arrangement or order determined for the mobile devices based on the angular positions provided by the RF nodes 120. Based on the comparison, the controller matches (step 716) identifiers with the detected individuals. For example, the controller can assign the mobile device 140-1 on the right according to the RF node 120-1 to the rightmost person 500-1 in the image, and the mobile device 140-2 on the left according to the RF node 120-1 to the person 500-2 left of person 500-1 in the image. This matching can operate without ambiguity when the number of mobile phones 140 matches the number of persons detected in the image (e.g., if individual 500-3 were not in the captured image). It can also be performed using the angular order determined for the mobile devices based on the angular positions provided by only one of the RF nodes 120, although using more than one RF node improves precision.

Alternatively, or in addition, the controller can compute the location of each mobile device based on the angular positions provided by the RF nodes 120-1, 120-2 (e.g., by computing an intersection of the two angle lines). This location has a depth component (from a reference point, e.g., the camera). The controller can rank the mobile devices in a depth order based on the depth components of the locations computed for the mobile devices. The controller can then match this depth order to a depth order of the individuals in the captured image.

As an aid to the correct matching of mobile devices to individuals (or individuals to mobile devices), particularly when individuals, such as individual 500-3, who are not using a mobile device may cause ambiguity, the controller can collect (step 718) RSSI information from multiple RF nodes 120-1, 120-2, to determine 2-dimensional range information to each of the mobile phones and to match individuals to mobile devices as previously described. Thus, the controller can use the signal strength information to supplement the matching based on angle of arrival computations. Again, the greater the number of RF nodes, the more accurate this RSSI-based range determination. This approximate distance information can also be used to calibrate the location of the smartphone-toting individuals within the captured images and distinguish them from an individual who is not carrying a smartphone (e.g., individual 500-3).

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. In addition, aspects of the present invention may be in the form of a computer program product embodied in one or more computer readable media having computer readable program code stored thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, such as the mobile device 140, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet, using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A method of tracking persons in a building; the method comprising the steps of:
   receiving, in electromagnetic signals transmitted by a mobile device carried by a person, an identifier associated with the person;
   capturing an image in synchronicity with or in near synchronicity with receiving the identifier associated with the person in the electromagnetic signals transmitted by the mobile device;
   image processing the captured image to detect an individual in the image and to acquire object information related to the individual;
   assigning the individual detected in the image to the person associated with the identifier in response to the synchronicity or near synchronicity of the image being captured with receipt of the electromagnetic signals having the identifier; and
   optically tracking the person throughout the building based on the acquired object information related to the individual.

2. The method of claim 1, wherein the step of assigning the individual detected in the image to the person associated with the identifier includes:
   matching an angle of the individual within the image with respect to an optical device that captured the image with an angle of arrival of the electromagnetic signals transmitted by the mobile device as measured by at least one radiofrequency (RF) node that received the electromagnetic signals, said matching taking into consideration a known location of the at least one RF node relative to a known location of the optical device.

3. The method of claim 1, Wherein the step of assigning the individual detected in the image to the person associated with the identifier includes:
   matching a distance of the individual in the image from an optical device that captured the image with a distance of the mobile device from at least one radiofrequency (RF) node that received the electromagnetic signals based on a received signal strength indicator (RSSI) value of the electromagnetic signals as measured by that at least one RF node, said matching taking into consideration a known location of the at least one RF node relative to a known location of the optical device.

4. The method of claim 1, wherein the step of assigning the individual detected in the image to the person associated with the identifier includes:
   matching a direction of the individual within the image with respect to an optical device that captured the image with a direction of the mobile device with respect to at least one radiofrequency (RF) node that is based on time differences of arrival (TDOA) of the electromagnetic signals as measured by the at least one RF node, said matching taking into consideration a known location of the at least one RF node relative to a known location of the optical device.

5. The method of claim 1, wherein the step of assigning the individual detected in the image to the person associated with the identifier includes:
   detecting in the image a fixed feature of the building that has a location that is calibrated to an optical device that captured the image; and
   comparing a location of the individual in the image with the location of the fixed fixture.

6. The method of claim 1, wherein the step of assigning the individual detected in the image to the person associated with the identifier includes:
   detecting in the image at least one RF node that receives the electromagnetic signals transmitted by the mobile device, the at least one RF node having a known location relative to an optical device that captured the image; and
   comparing a location of the individual in the image with the known location of the at least one RF node.

7. The method of claim 1, Wherein the object information includes an appearance attribute of the person.

8. The method of claim 1, further comprising the step of supplementing the optical tracking of the person throughout the building using RF-based positioning that is enhanced by inertial data transmitted in the electromagnetic signals by the mobile device.

9. A method of tracking persons in a building, the method comprising the steps of:
   acquiring identification information associated with a person from electromagnetic signals transmitted by a mobile device carried by the person;
   assigning the identification information associated with the person to a human detected in an image captured by an optical device;
   computing a location of the person in the building based on the electromagnetic signals transmitted by the mobile device carried by the person;
   enhancing the computed location of the person in the building based on inertial data included in the electromagnetic signals transmitted by the mobile device carried by the person;
   determining a current position of the person in the building based on the image captured of the human; and
   tracking the person through the building by supplementing the current position of the person in the building that is determined based on the image captured of the human with the computed location of the person in the building that is enhanced by the inertial data included in the electromagnetic signals transmitted by the mobile device carried by the person.

10. The method of claim 9, wherein the step of assigning the identification information associated with the person to a human detected in an image captured by an optical device includes matching an angle of the human within the image with respect to the optical device with an angle of arrival of the electromagnetic signals transmitted by the mobile device as measured by at least one radiofrequency (RF) node that received the electromagnetic signals, said matching taking into consideration a known location of the at least one RF node relative to a known location of the optical device.

11. The method of claim 9, wherein the step of assigning the identification information associated with the person to a human detected in an image captured by an optical device includes matching a distance of the human in the image from the optical device with a distance of the mobile device from at least one radiofrequency (RF) node that received the electromagnetic signals based on a received signal strength indicator (RSSI) value of the electromagnetic signals as measured by the at least one RF node, said matching taking into consideration a known location of the at least one RF node relative to a known location of the optical device.

12. The method of claim 9, wherein the step of assigning the identification information associated with the person to a human detected in an image captured by an optical device includes matching a direction of the human within the image with respect to an optical device with a direction of the mobile device with respect to at least one radiofrequency (RF) node that received the electromagnetic signals based on time differences of arrival (TDOA) of the electromagnetic signals as measured by the at least one RF node, said matching taking into consideration a known location of the at least one RF node relative to a known location of the optical device.

13. The method of claim 9, wherein the step of assigning the identification information associated with the person to a human detected in an image captured by an optical device includes:
   detecting in the image a fixed feature of the building that has a known location relative to the optical device; and
   comparing a location of the human in the image with the known location of the fixed fixture.

14. The method of claim 9, wherein the step of assigning the identification information associated with the person to a human detected in an image captured by an optical device includes:
   detecting in the image at least one RF node that receives the electromagnetic signals transmitted by the mobile device, the at least one RF node being disposed at a known location relative to the optical device; and
   comparing a location of the human detected in the image with the known location of the at least one RF node.

15. A system for tracking persons in a building, the system comprising:
   at least one radiofrequency (RF) node each with one or more receiver antennas receiving identification information associated with a person in electromagnetic signals transmitted by a mobile device carried by the person;
   at least one optical device capturing an image of a human in the building; and
   a controller in communication with the at least one RF node, to receive the identification information therefrom, and with the at least one optical device to receive the captured image therefrom, the controller being configured to:
   assign the identification information associated with the person to the human detected in an image captured by the at least one optical device;
   compute a location of the person in the building based on the electromagnetic signals transmitted by the mobile device carried by the person;
   enhance the computed location of the person in the building based on inertial data included in the electromagnetic signals transmitted by the mobile device carried by the person;
   determine a current position of the person in the building based on the image captured of the human; and
   track the person through the building by supplementing the current position of the person in the building that is determined based on the image captured of the human with the computed location of the person in the building that is enhanced by the inertial data included in the electromagnetic signals transmitted by the mobile device carried by the person.

16. The system of claim 15, wherein the controller is configured to assign the identification information associated with the person to a human detected in an image captured by the at least one optical device by matching an angle of the human within the image with respect to the at least one optical device with an angle of arrival of the electromagnetic signals transmitted by the mobile device as measured by the at least one RF node that received the electromagnetic signals, said matching taking into consideration a known location of the at least one RF node relative to a known location of the at least one optical device.

17. The system of claim 15, wherein the controller is configured to assign the identification information associated with the person to a human detected in an image captured by the at least one optical device by matching a distance of the human in the image from the optical device with a distance of the mobile device from at least one RF node that is based on a received signal strength indicator (RSSI) value of the electromagnetic signals as measured by the at least one RF node, said matching taking into consideration a known location of the at least one RF node relative to a known location of the at least one optical device.

18. The system of claim 15; wherein the controller is configured to assign the identification information associated with the person to a human detected in an image captured by the at least one optical device by:
   matching a direction of the human within the image with respect to the at least one optical device with a direction of the mobile device with respect to the at least one RF node that is based on time differences of arrival (TDOA) of the electromagnetic signals as measured by the at least one RF node, said matching taking into consideration a known location of the at least one RF node relative to a known location of the at least one optical device.

19. The system of claim 15, wherein the controller is configured to assign the identification information associated with the person to a human detected in an image captured by the at least one optical device by:
   detecting in the image a fixed feature of the building that has a known location relative to the at least one optical device; and
   comparing a location of the human in the image with the known location of the fixed fixture.

20. The system of claim 15; wherein the controller is configured to assign the identification information associated with the person to a human detected in an image captured by the at least one optical device by:
  detecting in the image the at least one RF node that receives the electromagnetic signals transmitted by the mobile device, the at least one RF node being disposed at a known location relative to the at least one optical device; and
  comparing a location of the human detected in the image with the known location of the at least one RF node.

* * * * *